United States Patent
Ito et al.

(10) Patent No.: US 9,756,322 B2
(45) Date of Patent: Sep. 5, 2017

(54) REMOTE DIAGNOSTIC DEVICE FOR COMPUTER-CONTROLLED APPARATUS

(71) Applicant: FANUC Corporation, Yamanashi (JP)

(72) Inventors: Kenichi Ito, Yamanashi (JP); Cheng Liu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 183 days.

(21) Appl. No.: 14/842,885

(22) Filed: Sep. 2, 2015

(65) Prior Publication Data

US 2016/0073103 A1     Mar. 10, 2016

(30) Foreign Application Priority Data

Sep. 9, 2014 (JP) ................. 2014-183563

(51) Int. Cl.
    *H04N 17/00* (2006.01)
    *H04N 5/232* (2006.01)
    *G05B 19/00* (2006.01)

(52) U.S. Cl.
    CPC .......... *H04N 17/002* (2013.01); *G05B 19/00* (2013.01); *H04N 5/23206* (2013.01)

(58) Field of Classification Search
    CPC .................. H04N 17/002; H04N 5/23206
    See application file for complete search history.

(56) References Cited

U.S. PATENT DOCUMENTS 5,732,212 A  *  3/1998  Perholtz ............ G06F 1/26
                                                709/217

FOREIGN PATENT DOCUMENTS

| EP | 0387359 A1 | 9/1990 |
| JP | H02-77907 A | 3/1990 |
| JP | H06-110537 A | 4/1994 |

* cited by examiner

*Primary Examiner* — Andy Rao
*Assistant Examiner* — Tyler Edwards
(74) *Attorney, Agent, or Firm* — Hauptman Ham, LLP

(57) ABSTRACT

A remote diagnostic device for a computer-controlled apparatus is provided with a camera configured to pick up an image on a display screen of the computer-controlled apparatus, a diagnostic computer installed in a remote place, and a signal conversion adapter. The signal conversion adapter transmits the image picked up by the camera to the diagnostic computer through a network communication line, automatically identifies an actuator of the computer-controlled apparatus, and converts a remote control signal received from the diagnostic computer into an input/output signal for the actuator and outputs the signal to the computer-controlled apparatus.

6 Claims, 3 Drawing Sheets

REMOTE DIAGNOSTIC DEVICE FOR COMPUTER-CONTROLLED APPARATUS

BACKGROUND OF THE INVENTION

Field of the Invention

The present invention relates to a remote diagnostic device for a computer-controlled apparatus.

Description of the Related Art

A numerical controller (hereinafter referred to as "CNC") mounted in a numerically-controlled machine tool is an example of a computer-controlled apparatus. If the CNC in the machine tool suffers a failure that cannot be overcome by a user, the user asks the manufacturer of the CNC for repair on the telephone or the like. The CNC manufacturer asks the user for information on the state of the CNC and gives the user an instruction for processing if the cause of the failure is detected by the notified state. If the machine tool is enabled to normally operate by the taught processing, a serviceman of the CNC manufacturer need not visit the site of the repair.

On the other hand, Japanese Patent Application Laid-Open No. 02-077907, for example, proposes a system in which a serviceman of a CNC manufacturer operates a CNC connected to a communication line from a remote place, thereby investigating the cause of a failure to eliminate the failure. Aided by this system, the serviceman need not visit the site of the failure to overcome the failure.

However, the above-described system is based on the premise that the CNC is previously incorporated with an electrical circuit and software that are required for the connection to the communication line.

In contrast, Japanese Patent Application Laid-Open No. 06-110537, for example, proposes an arrangement in which an external machine-side communication unit is provided separately from a body CNC, in order to remotely maintain a conventional CNC that is not incorporated with such a combination of an electrical circuit and software so that its failure cannot be overcome from a remote place.

FIG. 5 is a block diagram of a remote diagnostic device for the numerically-controlled machine tool disclosed in Japanese Patent Application Laid-Open No. 06-110537.

A machine tool 1 is installed in a factory and it is connected with a control unit 2 of the CNC. The CNC comprises the control unit 2 and a manual data input device with a display unit (hereinafter referred to as "CRT/MDI") 3. A machine-side communication unit 4 is connected between the control unit 2 and the CRT/MDI 3. The CRT/MDI 3 comprises an output display unit and an operating unit. The output display unit receives from the control unit 2 various diagnostic data on the machine tool 1 as screen information in the form of video signals and displays them on a CRT screen. The operating unit outputs a key operation input as an MDI signal to the control unit 2. The machine-side communication unit 4 performs switching communication control between the control unit 2 and the CRT/MDI 3 or a computer 9 (described later).

A telephone line modem (M) 5 is connected to the machine-side communication unit 4 so that data can be transferred between them through an RS-232C interface. The modem 5 is connected to a telephone line modem (M) 7 on the maintenance side through a public telephone network 6.

A maintenance-side communication unit 8 is connected to the maintenance-side modem 7 by the RS-232C interface, and the diagnostic computer 9 is connected to the maintenance-side communication unit 8. The computer 9 performs fault diagnosis, preventive maintenance, etc., of the numerically-controlled machine tool 1. To this end, the computer 9 receives the various diagnostic data from the control unit 2 and outputs the key operation input signal from the computer 9 as the MDI signal to the control unit 2, based on the result of the diagnosis.

FIG. 6 is a block diagram showing the internal configuration of the machine-side communication unit 4 of FIG. 5.

The video signals from the control unit 2 (FIG. 5) of the CNC are input to a synchronous circuit 4b through a terminal 4a and delivered to the CRT/MDI 3 through a terminal 4c. The output of the synchronous circuit 4b is output to a terminal 4g through a video RAM 4d, data compression unit 4e, and parallel/serial conversion unit (P/S) 4f. The terminal 4g is connected to the modem 5 (FIG. 5). Thus, the input video signals are recorded on the video RAM 4d after they are synchronized in the synchronous circuit 4b. Then, the video signals are compressed to a data capacity suitable for transmission by the public telephone network 6 in the data compression unit 4e, and moreover, converted into serial signals for the public telephone network 6 in the parallel/serial conversion unit 4f and output to the modem 5.

Further, a serial/parallel conversion unit (S/P) 4j is connected to the terminal 4g, and a selector switch 4i is connected to the serial/parallel conversion unit 4j. The selector switch 4i is connected to terminals 4h and 4k. Thus, the selector switch 4i normally connects the terminal 4h to the terminal 4k, and in this case, the MDI signal from the CRT/MDI 3 is sent to the control unit 2 of the CNC. When the fault diagnosis or the like is performed as described later, on the other hand, the selector switch 4i connects the terminal 4h to the serial/parallel conversion unit 4j. In this case, the MDI signal delivered in the form of a serial signal from the computer 9 through the public telephone network 6 is converted into a parallel signal in the serial/parallel conversion unit 4j and then sent to the control unit 2 (FIG. 5). The above-described machine-side communication unit 4 is constructed separately from the CNC and configured to be connected to the CNC by being inserted into a mounting slot of the CNC.

However, the technique disclosed in Japanese Patent Application Laid-Open No. 06-110537 has never been practically used because of the following problems.

A first problem is that there are a wide variety of interfaces used for the display device depending on the type, so that a circuit for converting the video signals must be changed according to the display device.

A second problem is that so many types of actuators are used for key operation that they should be ascertained in advance.

Accordingly, there has not been provided a simple, low-priced remote diagnostic device capable of being used in common for conventional remote-controllable, interface-free CNCs without regard to the types of the CNCs.

SUMMARY OF THE INVENTION

The present invention has been made to solve the above problems, and its object is to provide a remote diagnostic device compatible with CNCs having various display interfaces and actuator interfaces, without regard to the types of actuators and interfaces for display devices, whereby failure investigation and troubleshooting of the CNCs can be easily and inexpensively performed from a remote place.

A remote diagnostic device for a computer-controlled apparatus according to the present invention is configured to diagnose a fault through a network communication line from a remote place, and comprises a camera constructed separately from the computer-controlled apparatus and configured to pick up an image on a display screen of the computer-controlled apparatus, a signal conversion adapter, and a diagnostic computer installed in a remote place. Further, the signal conversion adapter comprises an image output unit configured to convert the image picked up by the camera into a digital signal and output the converted image signal to the network communication line, a network signal conversion unit configured to extract, from a network signal, a remote control signal input from the diagnostic computer through the network communication line, a control signal conversion unit configured to convert the remote control signal extracted by the network signal conversion unit into an input/output signal for an actuator of the computer-controlled apparatus, and a control signal switching unit configured to output the input/output signal converted by the control signal conversion unit to the computer-controlled apparatus. On the other hand, the diagnostic computer comprises an image display unit, configured to display the image signal received through the network communication line, and a remote control signal output unit configured to output, through the network communication line, the remote control signal used to operate the computer-controlled apparatus from the remote place.

The signal conversion adapter may further comprise a control signal detection/identification unit having a function of fetching a state of the input/output signal between the computer-controlled apparatus and the actuator to identify the type of the input/output signal and/or a function of fetching an identification signal for the actuator to identify the type of the actuator. The control signal conversion unit may be configured to convert the remote control signal into the input/output signal for the actuator based on the result of the identification by the control signal detection/identification unit.

The signal conversion adapter may further comprise a control signal detection unit configured to detect an input/output signal for the actuator or an identification signal for the actuator and output the result of the detection through the network communication line. On the other hand, the signal conversion adapter may further comprise a control signal identification unit, configured to detect the type of the actuator based on the received result of the detection by the control signal detection unit, and a remote control signal output unit configured to output the remote control signal to the computer-controlled apparatus according to the type of the actuator.

In a signal conversion adapter attached to a remote diagnostic device of a computer-controlled apparatus according to the present invention, the remote diagnostic device diagnoses a fault in the computer-controlled apparatus through a network communication line by means of a diagnostic computer installed in a remote place. The signal conversion adapter comprises an image output unit constructed separately from the computer-controlled apparatus and configured to convert an image on a display screen of the computer-controlled apparatus picked up by a camera into a digital signal and output the converted image signal to the network communication line, a network signal conversion unit configured to extract, from a network signal, a remote control signal input from the diagnostic computer through the network communication line, a control signal conversion unit configured to convert the remote control signal extracted by the network signal conversion unit into an input/output signal for an actuator of the computer-controlled apparatus, and a control signal switching unit configured to output the input/output signal converted by the control signal conversion unit to the computer-controlled apparatus.

The signal conversion adapter may further comprise a control signal detection/identification unit having a function of fetching a state of the input/output signal between the computer-controlled apparatus and the actuator to identify the type of the input/output signal and/or a function of fetching an identification signal for the actuator to identify the type of the actuator. The control signal conversion unit may be configured to convert the remote control signal into the input/output signal for the actuator based on the result of the identification by the control signal detection/identification unit.

The signal conversion adapter may further comprise a control signal detection unit configured to detect an input/output signal for the actuator or an identification signal for the actuator and output the result of the detection through the network communication line.

According to the present invention, a screen of a display device is photographed to obtain a picked-up image to be transmitted, instead of converting image data of the display device, so that the difference in interfaces of the display device need not be taken into consideration at all. Alternatively, the type of the actuator is automatically identified by providing means for reading the state of the input/output signal for the actuator and an ID code of the actuator. In this way, the necessity of consideration of the difference in the type of the actuator can be completely removed, so that remote service work can be achieved without regard to the types of CNCs. Further, a system for this effect can be easily and inexpensively constructed.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A remote diagnostic device according to the present invention is applicable to a computer-controlled apparatus. The computer-controlled apparatus may be a CNC used for a machine tool. The remote diagnostic device of the present invention for the CNC used for the machine tool will now be described by way of example with reference to the accompanying drawings.

First, a first embodiment of the remote diagnostic device for a computer-controlled apparatus according to the present invention will be described with reference to FIGS. 1 and 2.

Figure 1:
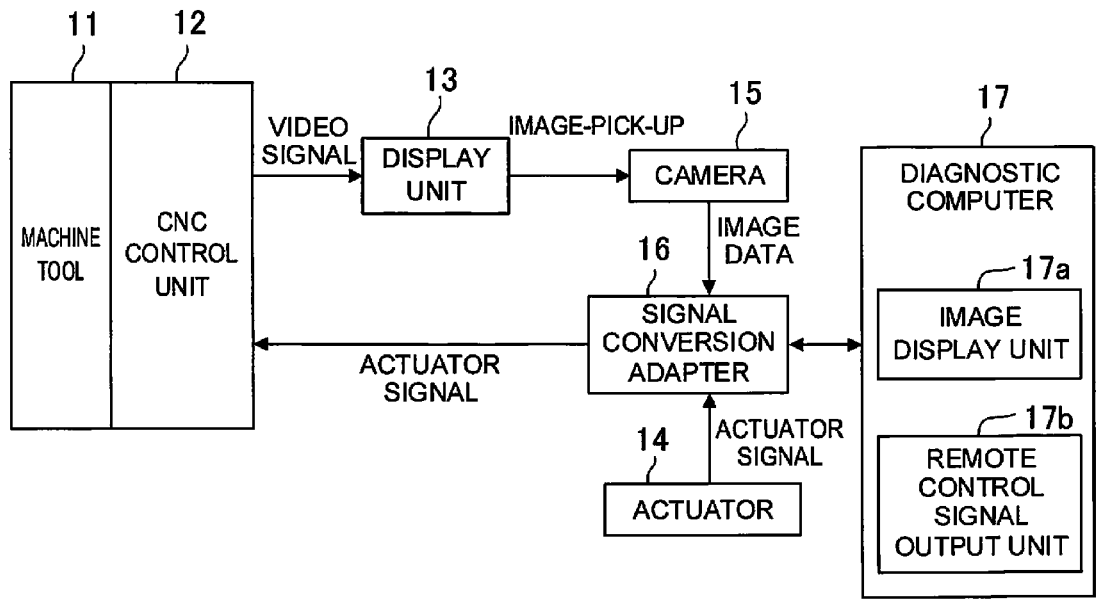
FIG. 1 is a schematic block diagram of a first embodiment of a remote diagnostic device for a computer-controlled apparatus according to the present invention.

FIG. 1 is a block diagram of the first embodiment of the remote diagnostic device for a computer-controlled apparatus according to the present invention.

A machine tool 11 is installed in a factory and it is incorporated with the CNC. The CNC comprises a CNC control unit 12, display device 13, and actuator 14. As the display device 13 displays the internal state of the CNC control unit 12 on a screen, an operator of the machine tool can recognize the state of the CNC. The screen is displayed on the display device 13 in response to a video signal from the CNC control unit 12. Further, the operator of the machine tool can operate the CNC control unit 12 by activating the actuator 14 with reference to an image displayed on the display device 13. The CNC control unit 12 and the actuator 14 are connected by an actuator interface cable for transmitting and receiving actuator signals as control signals. The CNC is normally used in this configuration.

The following is a description of the remote diagnostic device having the function of investigating the cause of a failure, if any, of the CNC used in the above-described configuration and correcting the failure in such a manner that a serviceman for the maintenance of the CNC remotely operates the CNC.

The remote diagnostic device in the factory comprises a camera 15 and a signal conversion adapter 16. The camera 15, which is used to image the contents of display on the screen, is located in front of the display device 13 and is normally connected to the signal conversion adapter 16. Normally, the signal conversion adapter 16 is connected to the CNC control unit 12 through an interface to which the actuator 14 is connected.

The signal conversion adapter 16 is connected with a diagnostic computer 17 by a network communication line so that data can be transferred between them. The signal conversion adapter 16 will be described in detail later. Image data picked up by the camera 15 is transmitted from the signal conversion adapter 16 toward the diagnostic computer 17, while a remote control signal for operating the CNC control unit 12 is transmitted from the diagnostic computer 17 toward the signal conversion adapter 16.

The diagnostic computer 17 is provided on the remote-place side so that the serviceman can perform fault diagnosis, preventive maintenance, etc., of the machine tool 11 from a remote place. The image data of the camera 15 received through the network communication line is displayed on a display screen of the diagnostic computer 17 so that the serviceman in the remote place can recognize the image. The serviceman notices the state of the CNC based on this image and operates the diagnostic computer 17. In this way, he/she can transmit a remote control signal for operating the CNC control unit 12 to the signal conversion adapter 16 through the network communication line.

Figure 2:
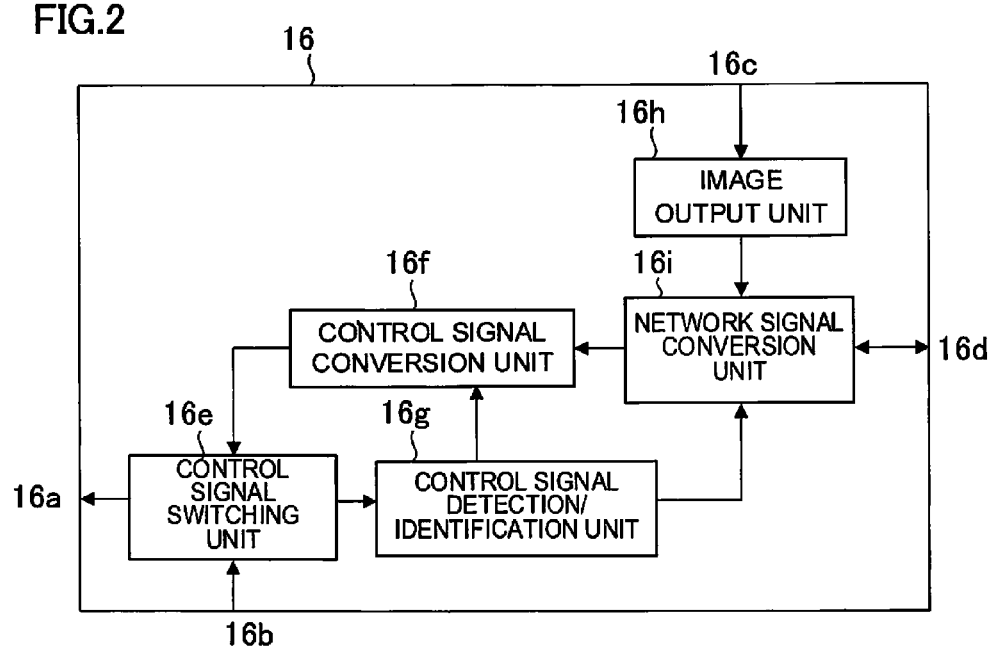
FIG. 2 is a schematic block diagram of a signal conversion adapter of the remote diagnostic device of FIG. 1.

FIG. 2 is a schematic block diagram of the signal conversion adapter 16 in the remote diagnostic device of FIG. 1.

Based on operation command data transmitted from the diagnostic computer 17 (FIG. 1), the signal conversion adapter 16 transmits an actuator signal to the CNC control unit 12 (FIG. 1) according to the type of the actuator signal. Further, an image signal from the display screen picked up by the camera 15 is input to the signal conversion adapter 16 through a terminal 16c. The signal conversion adapter 16 transmits this image signal to the diagnostic computer 17. A terminal 16d is connected to the network communication line. The signal conversion adapter 16 is constructed separately from the CNC. The signal conversion adapter 16 comprises control signal switching means 16e, control signal detection/identification means 16g, control signal conversion means 16f, image output means 16h, and network signal conversion means 16i.

The control signal switching means 16e switches the actuator signal to be transmitted to the CNC control unit 12 between the actuator 14 and the diagnostic computer 17. The control signal detection/identification means 16g identifies the type of the connected actuator based on the state of the actuator signal transferred between the CNC control unit 12 and the actuator 14. The control signal conversion means 16f converts the remote control signal from the diagnostic computer 17 into an actuator signal. The image output means 16h converts the image data picked up by the camera 15 and input through the terminal 16c into digital data and outputs it to the network signal conversion means 16i.

The network signal conversion means 16i converts the image data output from the image output means 16h into communication data depending on the connected network communication line and then outputs it to the terminal 16d. Based on the communication data transmitted through the network communication line, moreover, the network signal conversion means 16i extracts the remote control signal and delivers it to the control signal conversion means 16f.

The control signal conversion means 16f is connected to the network signal conversion means 16i, and the control signal switching means 16e is connected to the control signal conversion means 16f. The control signal switching means 16e is connected to terminals 16a and 16b. Specifically, in a normal mode in which the CNC is operated by means of the actuator 14 (FIG. 1), the control signal switching means 16e connects the terminals 16a and 16b so that the actuator signal from the actuator 14 can be delivered to the CNC control unit 12. When the CNC is operated through the diagnostic computer 17, on the other hand, the control signal switching means 16e performs switching such that the terminal 16a and the control signal conversion means 16f are connected to each other. In this way, the remote control signal transmitted from the diagnostic computer 17 to the signal conversion adapter 16 through the network communication line is converted into the actuator signal by the control signal conversion means 16f and then delivered to the CNC control unit 12.

The following is a description of a flow of maintenance work by the remote diagnostic device described above. If the operator detects a failure in the machine tool operating in the factory, he/she notifies the serviceman of the manufacturer of the CNC to that effect. Since the serviceman operates the CNC from the remote place, the signal conversion adapter 16 is prepared in the factory and connected to the network communication line.

The camera 15 is connected to the signal conversion adapter 16 so that the image data on the display screen of the CNC picked up by the camera 15 can be transmitted from the signal conversion adapter 16 to the serviceman's diagnostic computer 17 through the network communication line. Thereupon, the serviceman in the remote place can recognize the image on the screen of the CNC and identify the state of the CNC.

The serviceman investigates the cause of the failure based on the transmitted state of the CNC control unit 12. This investigation may be performed either by the serviceman based on the image data displayed on the display device 13 of the diagnostic computer 17 or automatically by diagnostic software of the diagnostic computer 17. The serviceman investigates the cause of the failure of the CNC control unit 12 and operates the CNC from the remote place by operating the diagnostic computer 17 to eliminate the failure.

However, the interface specification of the actuator signal varies depending on the manufacturer of the CNC, the type and the actuator of the CNC, and the like. For example, a key matrix system is known as an interface for the actuator signal. This system is configured so that key switches of the actuator 14 are arranged in a matrix based on key addresses and key data like those in an electrical circuit. The CNC control unit 12 specifies the key address and reads the key data replied from the actuator 14, thereby identifying the operating state of the key switches. The numbers of key addresses and key data, key location, and signal timings for the key addresses and key data vary depending on the CNC manufacturer and the type and the actuator of the CNC. Suitable control signal conversion means must be provided based on previous understanding of these variations.

Thus, according to the present invention, there is provided a remote diagnostic device with the control signal detection/identification means 16g for identifying the difference in the interface for the actuator signal.

The control signal detection/identification means 16g first reads a state in which the actuator signal is transferred with the terminals 16a and 16b connected by the control signal switching means 16e, detects the numbers of key addresses and key data, key location, and signal timings for the key addresses and key data, and specifies the interface for the actuator signal. The specification result is delivered to the control signal conversion means 16f, and the remote control signal is converted into the actuator signal, depending on the difference in the interface for the actuator signal, and transmitted to the control signal switching means 16e. The operation of the CNC control unit 12 is enabled when the control signal switching means 16e switches the signal so that the terminal 16a and the control signal conversion means 16f are connected.

Some actuators are given an ID signal for their identification, while the types of others are identified by the CNC control unit 12 in such a manner that identification of the ID signal is performed by the interface for the actuator signal. The control signal detection/identification means 16g may be configured to read the state of transfer of the ID signal and identify the actuator type.

Then, a second embodiment of the remote diagnostic device for a computer-controlled apparatus according to the present invention will be described with reference to FIG. 3.

Figure 3:
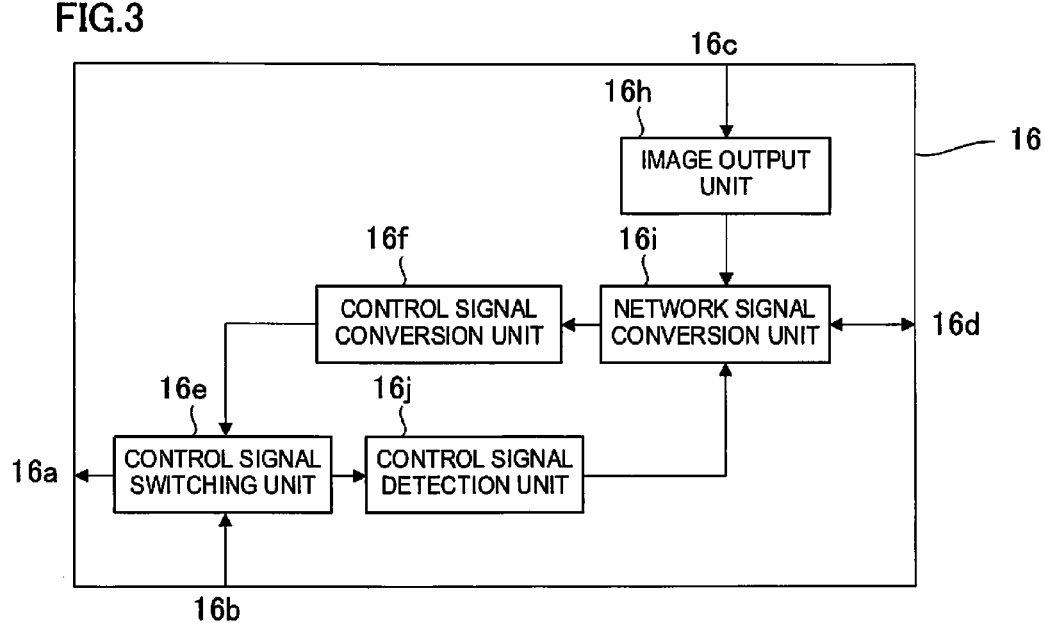
FIG. 3 is a schematic block diagram of a second embodiment of the remote diagnostic device for a computer-controlled apparatus according to the present invention.

The present embodiment differs from the first embodiment only in that control signal detection means 16j is provided in place of the control signal detection/identification means 16g of the signal conversion adapter 16 of FIG. 2, as shown in FIG. 3. In this embodiment, a read actuator signal is directly delivered by a network signal conversion means 16i, without identifying an interface for the actuator signal and the actuator type by the signal conversion adapter 16, and is sent to a diagnostic computer 17 through a network communication line.

Figure 4:
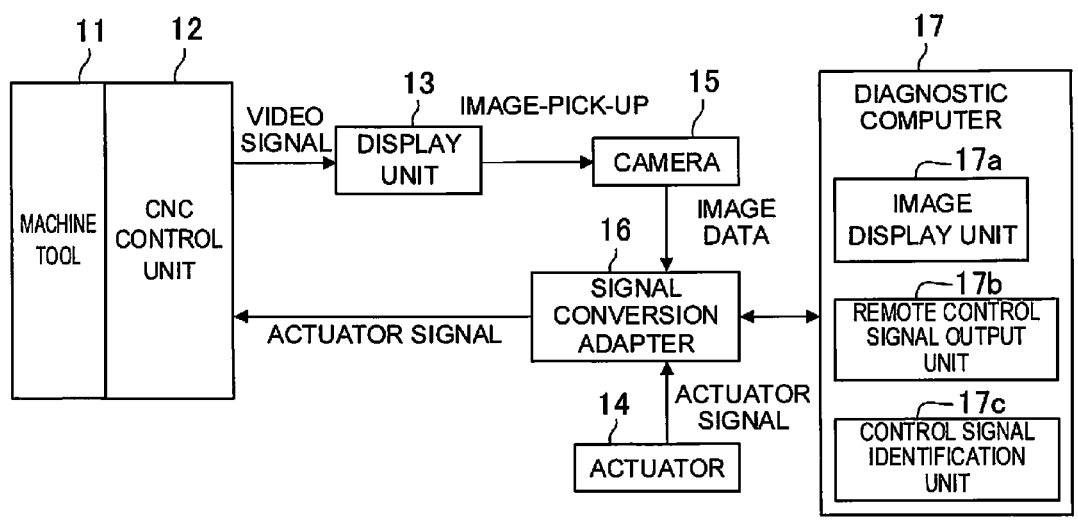
FIG. 4 is a schematic block diagram of a third embodiment of the remote diagnostic device for a computer-controlled apparatus according to the present invention.
Figure 5:
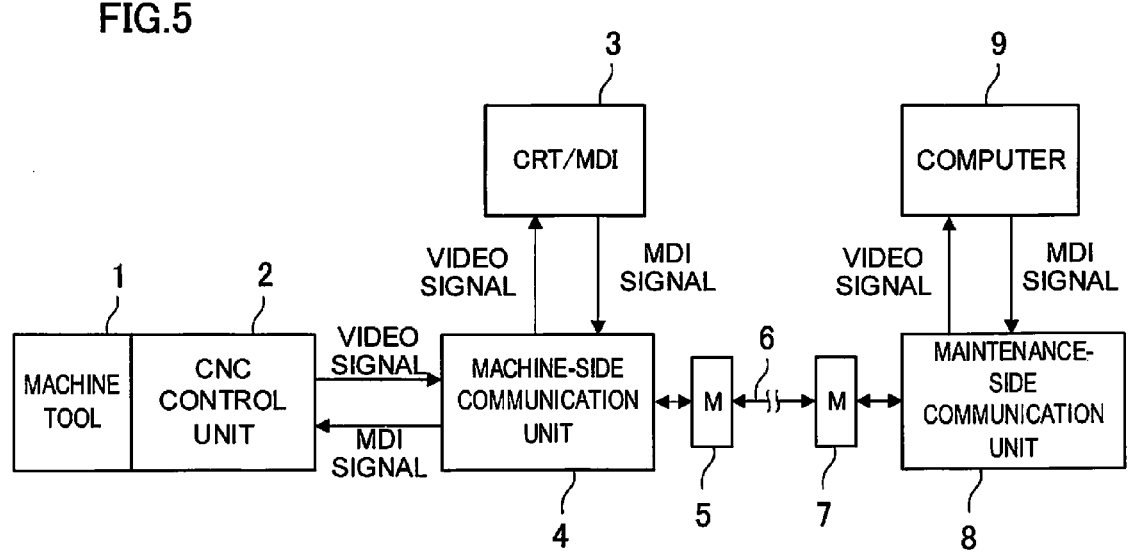
FIG. 5 is a block diagram showing an example of a prior art remote diagnostic device.
Figure 6:
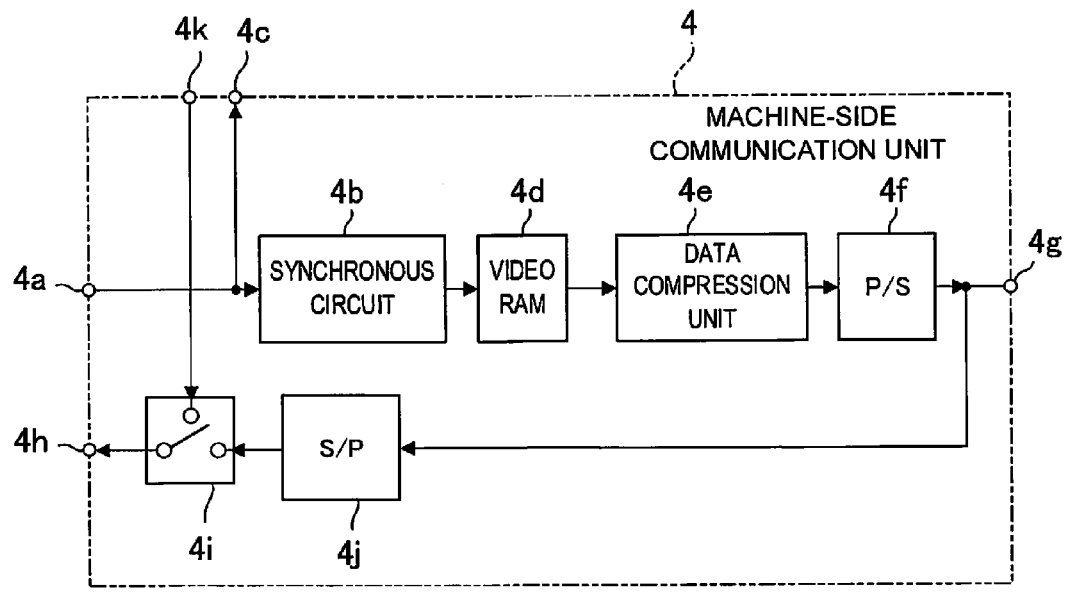
FIG. 6 is a block diagram showing the internal configuration of a machine-side communication unit of the remote diagnostic device shown in FIG. 5.

Then, a third embodiment of the remote diagnostic device for a computer-controlled apparatus according to the present invention will be described with reference to FIG. 4.

The present embodiment differs from the first embodiment only in that a control signal identification function 17c is added to the diagnostic computer 17 shown in FIG. 1. In this embodiment, the control signal identification function 17c may be used to specify an interface for an actuator signal by information on the state of transfer of the actuator signal delivered from a signal conversion adapter 16 and an identification signal for an actuator. The specification result may be used to produce a remote control signal. With this configuration, the signal conversion adapter 16 need not be provided with means (control signal detection means 16j of FIG. 3) for identifying the interface for the actuator signal, so that the circuit scale of the signal conversion adapter 16 can be reduced.

Thus, by the use of the remote diagnostic device of the present invention, the failure of the CNC control unit 12 can be corrected from a remote place. If the CNC mounted in the machine tool gets out of order, remote diagnosis can be achieved such that the cause of the failure is remotely investigated by means of the remote diagnostic device. While the remote diagnosis of the machine tool mounded with the CNC has been described in connection with the embodiments of the present invention, the remote diagnosis of the present invention can also be applied to other computer-controlled apparatuses, such as an FA apparatus, than the CNC.

The invention claimed is:

1. A remote diagnostic device for a computer-controlled apparatus, which diagnoses a fault through a network communication line from a remote place, the remote diagnostic device comprising:
    a camera constructed separately from the computer-controlled apparatus and configured to pick up an image on a display screen of the computer-controlled apparatus;
    a signal conversion adapter; and
    a diagnostic computer installed in a remote place,
    wherein the signal conversion adapter comprises:
    an image output unit configured to convert the image picked up by the camera into a digital signal and output the converted image signal to the network communication line;
    a network signal conversion unit configured to extract, from a network signal, a remote control signal input from the diagnostic computer through the network communication line;
    a control signal conversion unit configured to convert the remote control signal extracted by the network signal conversion unit into an input/output signal for an actuator of the computer-controlled apparatus; and
    a control signal switching unit configured to output the input/output signal converted by the control signal conversion unit to the computer-controlled apparatus, and
    wherein the diagnostic computer comprises:
    an image display unit configured to display the image signal received through the network communication line; and
    a remote control signal output unit configured to output, through the network communication line, the remote control signal used to operate the computer-controlled apparatus from the remote place.

2. The remote diagnostic device for a computer-controlled apparatus according to claim 1, wherein the signal conversion adapter further comprises a control signal detection/identification unit having a function of fetching a state of the input/output signal between the computer-controlled apparatus and the actuator to identify the type of the input/output signal and/or a function of fetching an identification signal for the actuator to identify the type of the actuator, and
    the control signal conversion unit converts the remote control signal into the input/output signal for the actuator based on the result of the identification by the control signal detection/identification unit.

3. The remote diagnostic device for a computer-controlled apparatus according to claim 1, wherein
the signal conversion adapter further comprises a control signal detection unit configured to detect an input/output signal for the actuator or an identification signal for the actuator and output the result of the detection through the network communication line, and
the signal conversion adapter further comprises
a control signal identification unit configured to detect the type of the actuator based on the received result of the detection by the control signal detection unit, and
a remote control signal output unit configured to output the remote control signal to the computer-controlled apparatus according to the type of the actuator.

4. A signal conversion adapter attached to a remote diagnostic device of a computer-controlled apparatus, wherein the remote diagnostic device diagnoses a fault in the computer-controlled apparatus through a network communication line by means of a diagnostic computer installed in a remote place, the signal conversion adapter comprising:
an image output unit constructed separately from the computer-controlled apparatus and configured to convert an image on a display screen of the computer-controlled apparatus picked up by a camera into a digital signal and output the converted image signal to the network communication line,
a network signal conversion unit configured to extract, from a network signal, a remote control signal input from the diagnostic computer through the network communication line,
a control signal conversion unit configured to convert the remote control signal extracted by the network signal conversion unit into an input/output signal for an actuator of the computer-controlled apparatus, and
a control signal switching unit configured to output the input/output signal converted by the control signal conversion unit to the computer-controlled apparatus.

5. The signal conversion adapter according to claim 4, further comprising a control signal detection/identification unit having a function of fetching a state of the input/output signal between the computer-controlled apparatus and the actuator to identify the type of the input/output signal and/or a function of fetching an identification signal for the actuator to identify the type of the actuator, wherein
the control signal conversion unit converts the remote control signal into the input/output signal for the actuator based on the result of the identification by the control signal detection/identification unit.

6. The signal conversion adapter according to claim 4, further comprising a control signal detection unit configured to detect an input/output signal for the actuator or an identification signal for the actuator and output the result of the detection through the network communication line.

* * * * *